United States Patent
Ross et al.

(10) Patent No.: US 6,530,593 B1
(45) Date of Patent: Mar. 11, 2003

(54) AIRBAG HAVING BACK PARTS WITH A LARGER SURFACE THAN THE FRONT PART

(75) Inventors: Hubert Ross, Oberursel (DE); Frank Saeuberlich, Wiesbaden (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/484,881

(22) Filed: Jan. 18, 2000

(30) Foreign Application Priority Data

Jan. 28, 1999 (DE) .......................... 199 03 361

(51) Int. Cl.⁷ ............................................. B60R 21/24
(52) U.S. Cl. ..................... 280/729; 280/731; 280/743.1
(58) Field of Search ............................. 280/729, 728.1, 280/731, 743, 732, 728.2, 743.1, 739

(56) References Cited

U.S. PATENT DOCUMENTS

| | | | |
|---|---|---|---|
| 3,990,726 A | * 11/1976 | Oka et al. ..................... 280/739 |
| 5,186,488 A | * 2/1993 | Takano ......................... 280/728 |
| 5,249,824 A | 10/1993 | Swann et al. ................. 280/729 |
| 5,310,216 A | * 5/1994 | Wehner et al. ........... 280/743 R |
| 5,333,903 A | * 8/1994 | Eyrainer et al. ......... 280/743 R |
| 5,395,134 A | * 3/1995 | Gunn et al. ............. 280/743 R |
| 5,421,610 A | * 6/1995 | Kavanaugh et al. ..... 280/743.1 |
| 5,494,314 A | * 2/1996 | Kriska et al. ................ 280/740 |
| 5,683,109 A | 11/1997 | Birman ..................... 280/743.2 |
| 5,848,805 A | * 12/1998 | Sogi et al. ................ 280/743.2 |
| 5,871,231 A | * 2/1999 | Richards et al. ............. 280/735 |
| 5,899,493 A | * 5/1999 | Berger ......................... 280/739 |
| 5,913,535 A | * 6/1999 | Taguchi et al. ............. 280/729 |
| 5,941,559 A | * 8/1999 | Rudolf et al. ............... 280/729 |
| 6,019,390 A | * 2/2000 | Keshavaraj ............... 280/743.1 |

FOREIGN PATENT DOCUMENTS

| JP | 09048307 | 2/1997 |
| WO | WO9404734 | 3/1994 |

* cited by examiner

*Primary Examiner*—Kevin Hurley
*Assistant Examiner*—Paul Royal, Jr.
(74) *Attorney, Agent, or Firm*—Jarett Rieger; Lonnie Drayer (57) ABSTRACT

An airbag has a front part facing a vehicle occupant and from two back parts facing away from the vehicle occupant. The two back parts have a larger surface than the front part. The back parts each have a first portion which is dimensioned in such a way that the two first portions of the back parts jointly correspond to the front part in terms of shape and size. The two back parts are connected along the free edges of their first portions to the front part along the outer circumference of the latter. The back parts have second portions that extend essentially transversely to the front part and are connected to one another along their outer edges. The connection of the second portions of the back parts is interrupted at least in one portion to form a gas inlet orifice.

6 Claims, 7 Drawing Sheets

FIG-7

AIRBAG HAVING BACK PARTS WITH A LARGER SURFACE THAN THE FRONT PART

FIELD OF THE INVENTION

The invention relates to an airbag and a method for making an airbag.

BACKGROUND OF THE INVENTION

An inflated airbag is generally characterized by three dimensions, namely its length, width and depth. In particular, the depth of the airbag has a great influence on the ability of the airbag to protect a vehicle occupant in the event of an accident. It is possible, by setting the airbag depth, to adapt the airbag optimally to specific vehicles or installation positions, in order to achieve optimum vehicle occupant protection. In known airbags which have only two-dimensional seams, that is to say seams made in one flat plane, it is possible only to a limited extent to adapt the airbag to different applications, since only a restricted number of different shapes or designs of an airbag could be implemented. In particular, changes in the airbag depth were complicated to carry out and expensive. It was therefore often not possible also to achieve optimum protection for a vehicle occupant.

BRIEF DESCRIPTION OF THE DRAWINGS

The invention is described below by way of example with reference to the accompanying drawings in which.

DETAILED DESCRIPTION OF THE INVENTION

The method of making an airbag according to the invention is described below in individual steps by means of the accompanying drawings and with reference to an exemplary embodiment of an airbag according to the invention.

Figure 1:
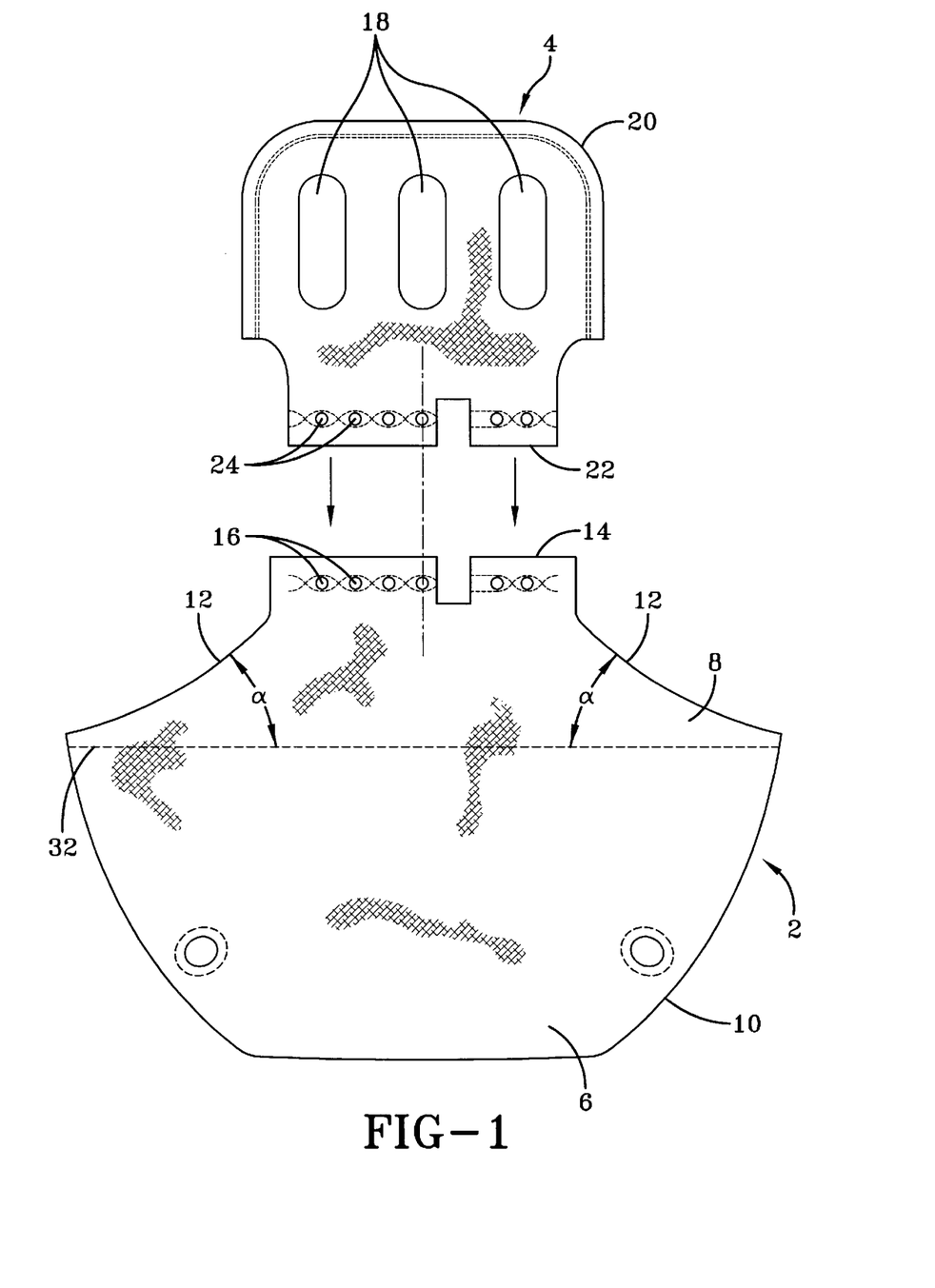
FIG. 1 is a top view of a back part and a first side part of the inner bag of the airbag according to the invention.

FIG. 1 is a top view of a back part 2 of the airbag and a side part 4 of the inner bag prior to their connection to one another. The back part 2 has a first portion 6 and a second portion 8. The first portion 6 is subsequently connected along the free edge 10 to the front part of the airbag, while the second portion 8 of the back part 2 is subsequently connected along its free edges 12 to the second portion of the other back part. The back part is not subsequently connected to the second back part along the free edge 14, in order to form a gas inlet orifice. Fastening orifices 16 are formed in parallel with the free edge 14 and subsequently serve for fastening the airbag to a gas generator or a gas generator carrier. Seams, running around the orifices 16 and to be made later, are shown, these being indicated by dashed lines, said seams serving for reinforcing the orifices 16 and fixing the side part 4 to the back part 2. By means of different inclinations of the edges 12, that is to say by increasing or reducing the angles α, the depth of the subsequent airbag can be changed very easily, without other components having to be changed. If the width of the back part 2 along the dashed transitional line from the first portion 6 to the second portion 8 remains the same and the length of the edge 14 defining the gas inlet orifice is constant, a change in the angle α brings about a change in the distance of the edge 14 from the first portion 6 and therefore a change in the length of the second portion 8 of the back part 2.

The side part 4 of the inner bag to be formed has three overflow orifices 18 which subsequently allow the gas to overflow from the inner bag into the actual airbag. The side part 4 of the inner bag is subsequently connected to a second, essentially identically designed side part 4 along the U-shaped free edge 20.

However, as the first production step after the parts have been cut to size, the side part 4 of the inner bag is first connected to the second portion 8 of the back part 2 along the free edge 22 of the side part 4. For this purpose, as indicated by the arrow in FIG. 1, the side part 4, swung round, is laid onto the back part 2. The edge 22 then comes into congruence with the edge 14. The orifices 24 are likewise formed, parallel to the edge 22 of the side part 4, said orifices being congruent with the orifices 16 and serving, jointly with these, for fastening the airbag to a gas generator carrier. The side part 4 of the inner bag then serves at the same time for reinforcing the fastening of the back part 2 to a gas generator carrier, so that the forces occurring during deployment can be transmitted more reliably.

Figure 2:
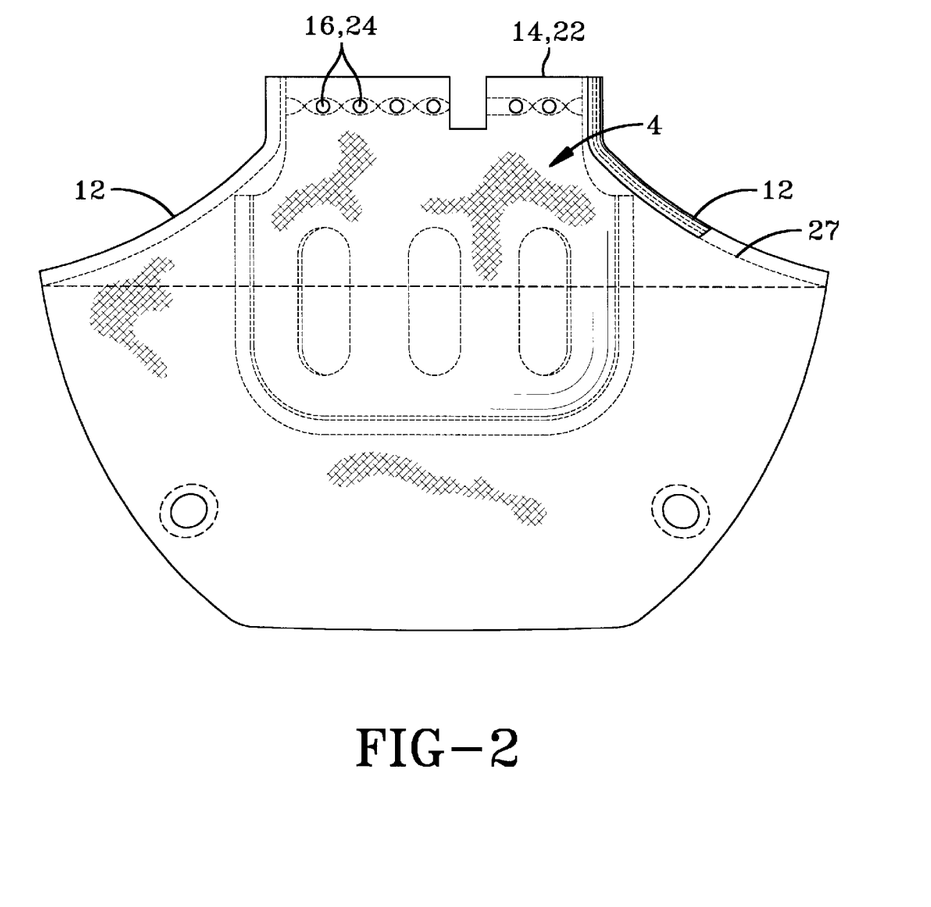
FIG. 2 is a top view of a back part with a stitched-on first side part of an inner bag.

FIG. 2 is a top view according to FIG. 1 of the back part 2, onto which the side part 4 of the inner bag is laid, so that the free edge 14 of the back part 2 comes into congruence with the edge 22 of the side part 4. The orifices 16 and 24 likewise lie congruently one above the other. The two parts 2, 4 are connected to one another by means of the seams 26 which run around the orifices 16, 24 and therefore at the same time reinforce these. This stitching operation can be carried out very simply, because it can take place merely two dimensionally in one plane.

After the side parts 4 have been connected to the respective back part 2 the two back parts are stitched along the edges 12 shown in FIG. 2. The two back parts are laid flat one on the other in such a way that the two side parts 4 of the inner bag lie on the two opposite outer faces of the back parts lying one on the other. These seams, too, are only two-dimensional, thus making very simple stitching possible.

Figure 3:
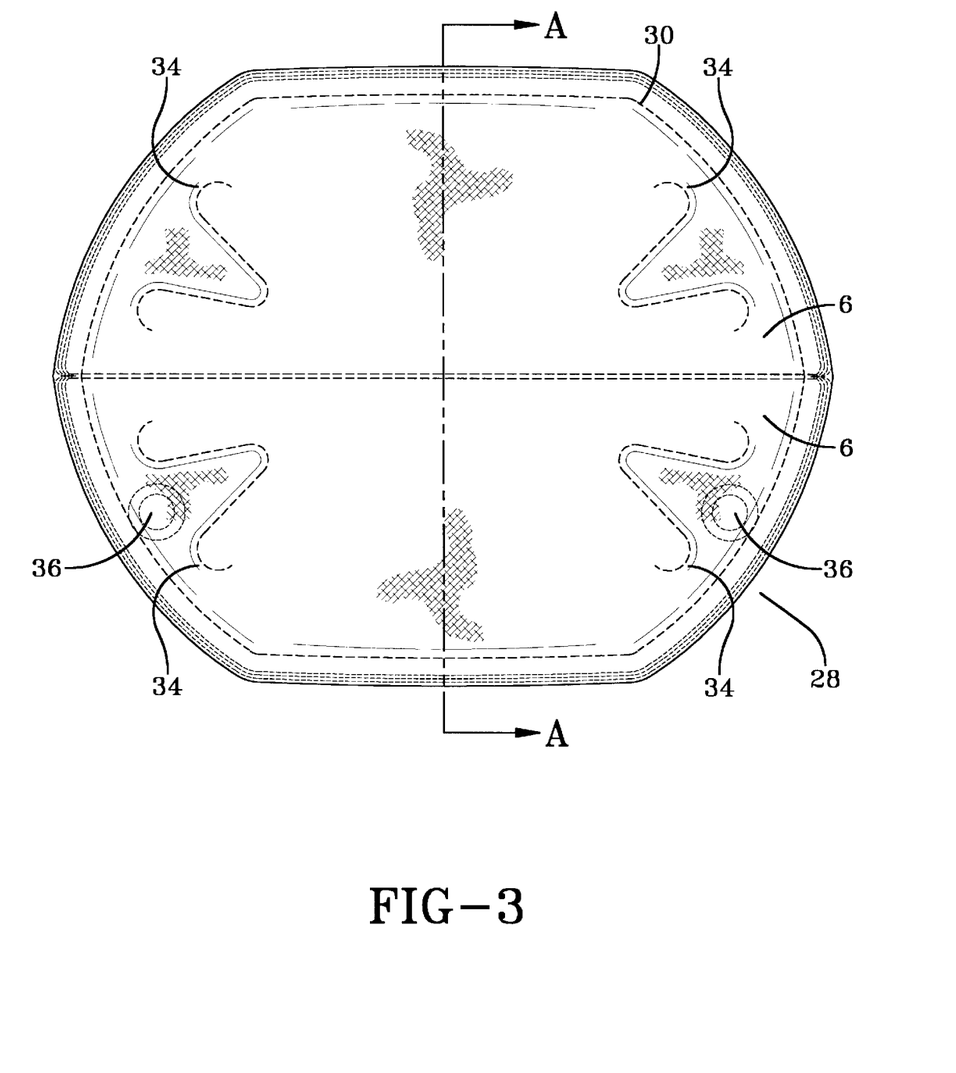
FIG. 3 is a top view of the front portion of the airbag according to the invention.
Figure 4:
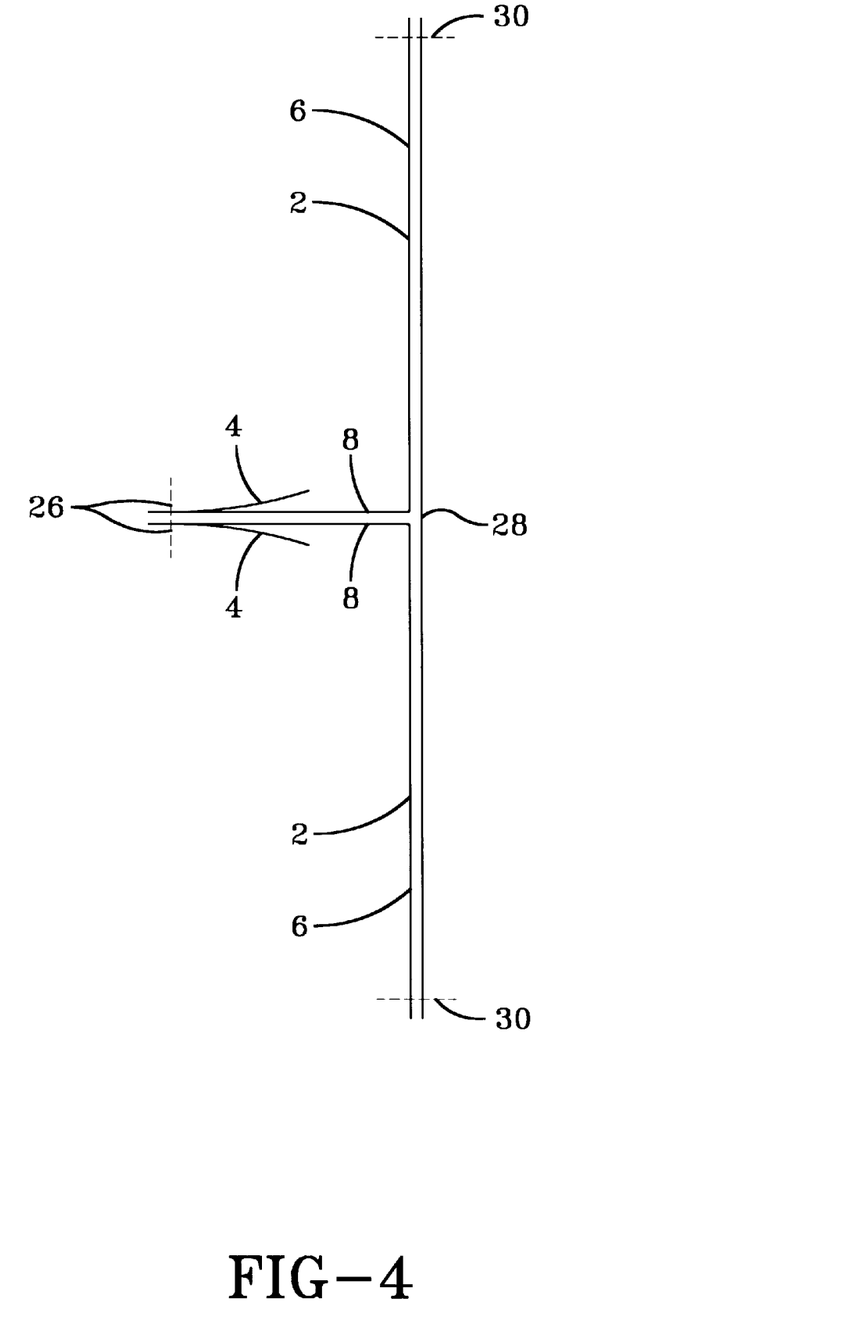
FIG. 4 is a sectional view of the airbag along line A—A in FIG. 3.

Next, the two back parts 2 are stitched to the front part 28, as shown in FIGS. 3 and 4. FIG. 3 is a top view of the front part 28 of the airbag. Dashed lines illustrate the two first portions 6 of the back part 2 which have been swung apart in such a way that their first portions 6 form a plan surface. Thus, when laid one on the other, the first portion 6 of the back parts 2 correspond exactly to the surface of the front part 28. The swung-out back parts 2 and the front part 28 are laid congruently one above the other (see FIG. 4). The first portions 6 of the back parts 2 are then connected to the front part 28 along their outer circumference via the seams 30 illustrated by dashed lines in FIG. 3, and, once again, this seam is only two-dimensional and can therefore be made very simply. The dashed lines 32 indicate the transition of the first portions 6 into the second portions 8 of the back parts 2. In addition to the seams 30, the front part 28 and the first portions 6 of the back parts 2 may be connected via tear-open seams 34 which tear open in a controlled manner when the airbag is filled with gas and which thus control a focused deployment of the airbag. In addition, outflow orifices 36 are provided in a first portion 6 of a back part 2 in FIG. 3, said outflow orifices subsequently allowing the gas to escape from the airbag. The outflow orifices 36 are surrounded in a known way by tear-open seams 34, which allow a controlled opening of the outflow orifices 36 in a predetermined state of deployment of the airbag.

FIG. 4 is a sectional view along the line A—A in FIG. 3 after the back parts 2 have been connected to the front part 28. The front part 28, on which the first portions 6 of the back parts 2 lie in parallel and congruently, is shown at the bottom. The two parts 6, 28 are connected to one another via the circumferential seam 30. The second portions 8 of the back parts 2 extend away from the front part 28 essentially transversely to the latter. The side parts 4 for the inner bag to be subsequently produced are fastened to the free edge 14 of the second portions 8 of the back parts 2. As may be seen in FIG. 4, the circumferential seam 30, which connects to the front part 28 and the back parts 2 to one another, is a two-dimensional seam which can be produced in an extremely simple way simply by running a stitching device down in one plane.

Figure 5:
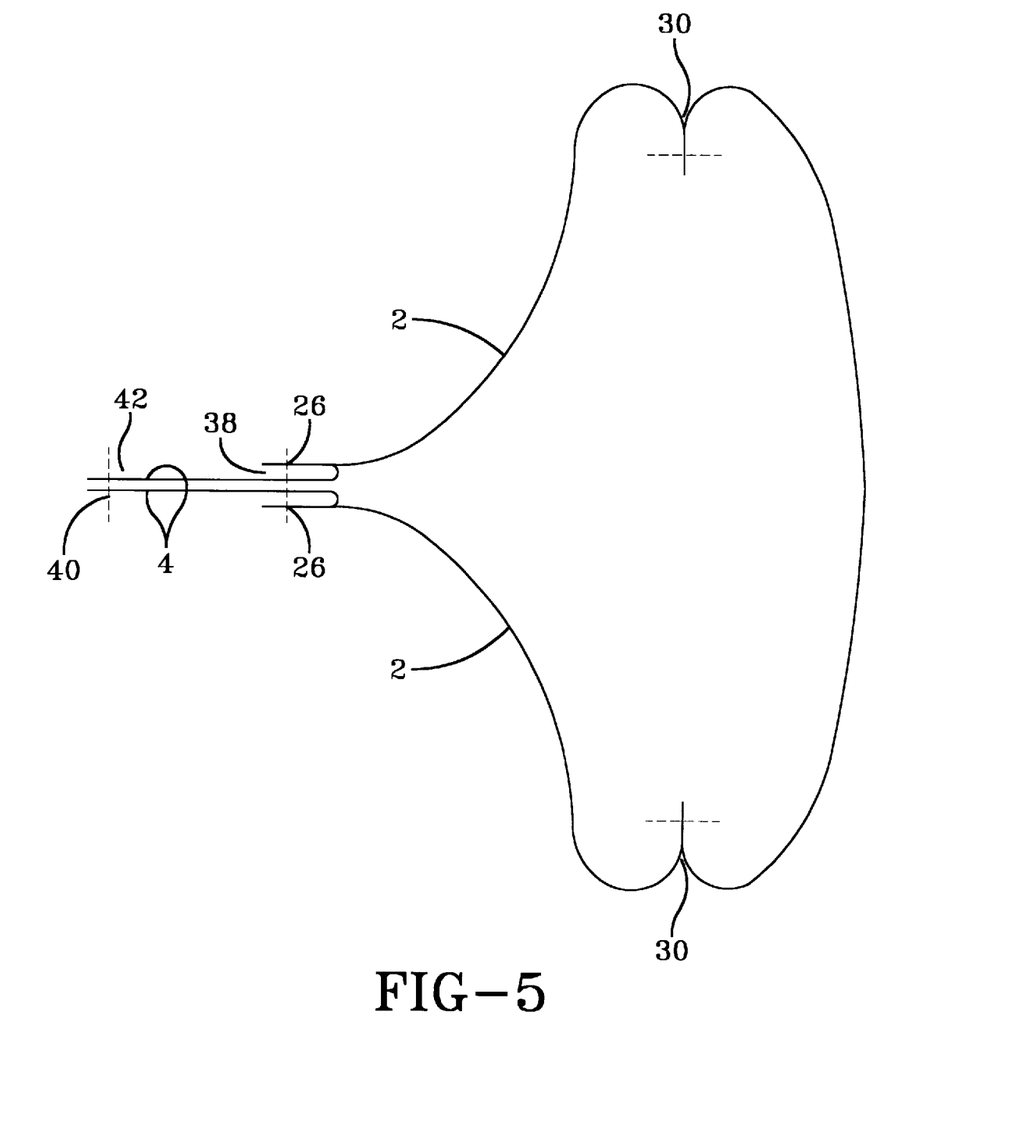
FIG. 5 is a sectional view of the airbag, similar to FIG. 4, after the airbag has been turned inside out.

After the back parts 2 have been stitched to the front part 28, the entire airbag is turned inside out, that is to say, "wrong side out", so that the state illustrated in FIG. 5 is assumed. In this state, the seam 30 and 27 (see FIG. 2) are arranged inside the airbag, thus ruling out possible injury to a vehicle occupant by the seams. The two side parts 4 are then drawn out of the interior of the airbag through the gas inlet orifice 38, so that they come to lie one on the other in parallel and congruently, as shown in FIG. 5, so that they can then be connected to one another along their outer edge 20 (see FIG. 1) by means of a seam 40. Subsequently, the inner bag 42 stitched in this way, which consists of the two side parts 4 stitched at their circumference, is pushed into the interior of the airbag again.

Figure 6:
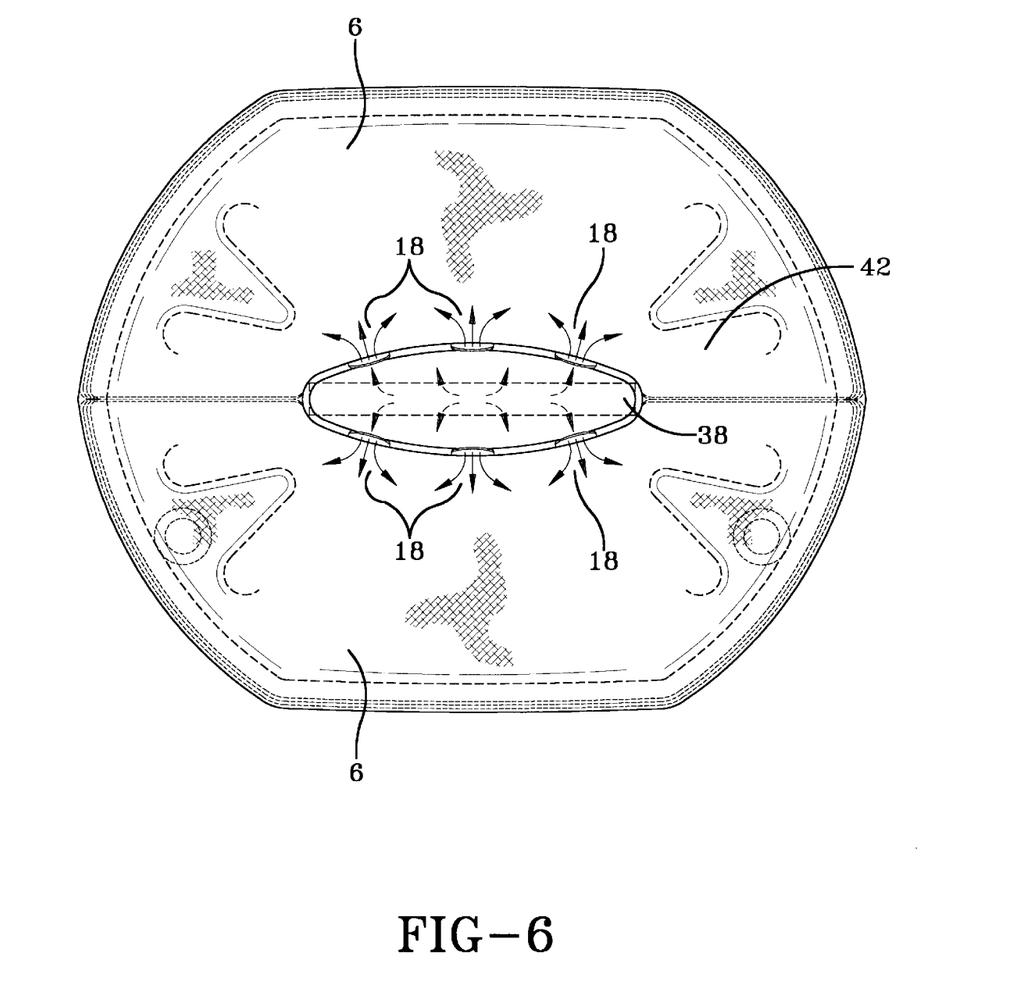
FIG. 6 is a diagrammatic top view of the airbag during filing.

FIG. 6 is a diagrammatic top view of the finished airbag illustrating the inflow of the gas during inflation. As illustrated by the dashed arrows, the gas first flows out of the gas inlet orifice 38, illustrated by dashed lines, into the inner bag 42 which is thus first inflated. As indicated by the arrows, the gas flows out of the inner bag 42 through the overflow orifices 18 into the interior of the airbag. In this case, the overflow orifices 18 are arranged in such a way that the gas flows into the airbag essentially downward and upward, but essentially not in the lateral direction or in the depth direction toward a vehicle occupant. This ensures that the airbag is first deployed upward and downward, so that full protection is first achieved there and both large and small vehicle occupants can be protected safely.

It can likewise be seen clearly in FIG. 6 that the position of the gas inlet orifice 38 can be shifted, that is to say displaced upward and downward in the drawing, by designing the first portions 6 of the back parts 2 in a different size.

Figure 7:
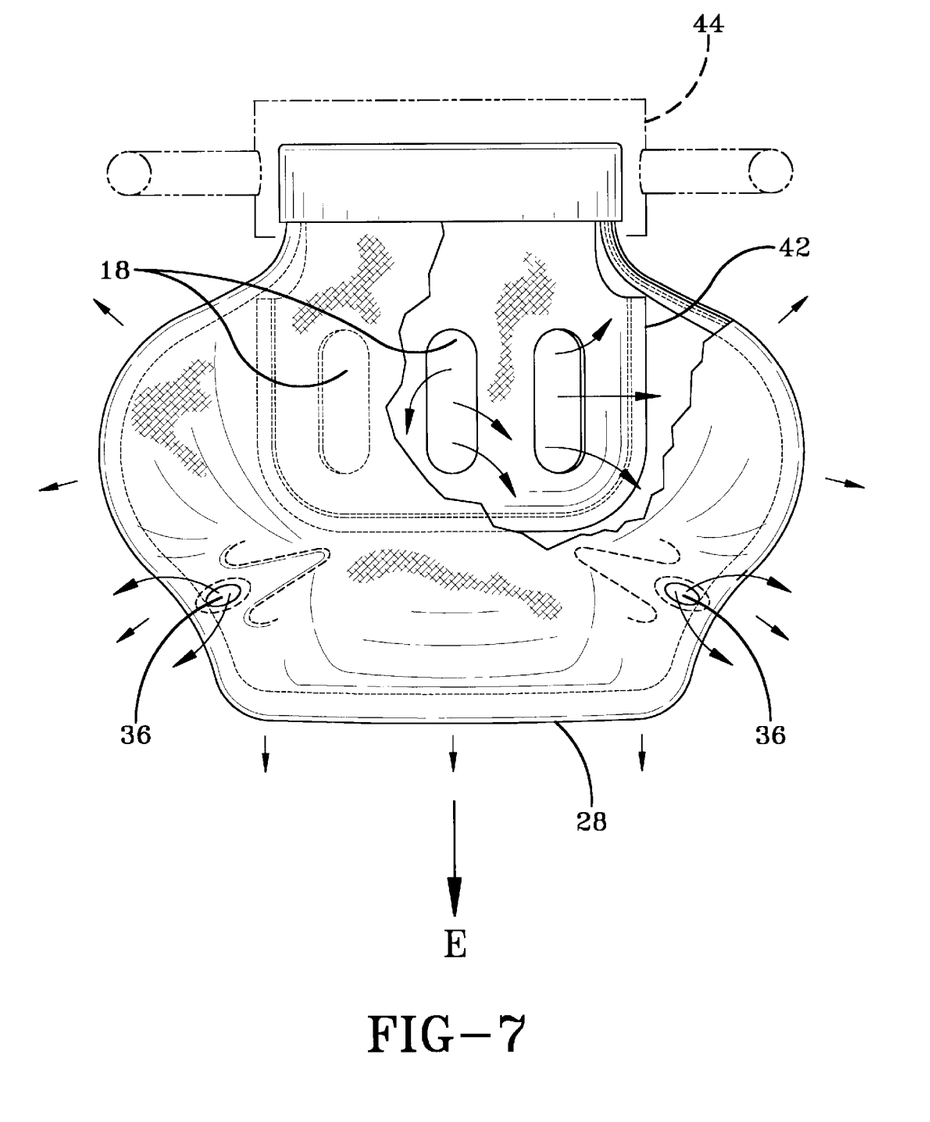
FIG. 7 is a diagrammatic, partially sectional side view of the airbag during inflation.

FIG. 7 is a partially sectional diagrammatic side view of the airbag illustrated in FIG. 6, during inflation. It can be seen particularly clearly, here, that the gas essentially does not flow in the depth direction or main deployment direction E toward the vehicle occupant out of the inner bag 42 through the overflow orifices 18 into the airbag. A high momentum of the front part 28 in the direction E, that is to say in the direction of a vehicle occupant, is thereby avoided.

Thus, particularly in so-called "out-of-position" situations, in which a vehicle occupant is not in a preferred position, the risk of injury by the airbag being deployed with great force and rapidly can be reduced. The high pressures and forces occurring when the airbag begins to be inflated are transmitted essentially via the inner bag 42 to the gas generator housing 44, to which the airbag is fastened. Consequently, lower forces act in the actual inner space of the airbag, and the airbag, consisting of the back parts 2 and front part 28, is subjected to a less pronounced load. For this reason, the back part 2 and the front part 28 may be manufactured from lighter material having a lower load-bearing capacity, as a result of which a weight reduction can be achieved. This leads, inter alia, to a more rapid deployment of the airbag 28 on account of its lower mass inertia and, because of the lighter fabric, also to less risk of injury to vehicle occupants. Moreover, FIG. 7 illustrates the outflow orifices 36, through which the gas can escape out of the airbag again in a known way, particularly during the impact of a vehicle occupant on the airbag, in order to achieve better damping.

Many changes and modifications in the above described embodiments of the invention can, of course, be carried out without departing from the scope thereof. Accordingly, that scope is intended to be limited only by the scope of the appended claims.

We claim:
1. An airbag comprising:
   a) a front part facing a vehicle occupant;
   b) two back parts for facing away from the vehicle occupant, the peripheral edges of the first portions of the two back parts and the front part have both rectilinear and curvilinear portions, the two back parts having a larger surface than the front part and the back parts each having a first portion which is dimensioned in such a way that when the first portions of the two back parts are placed adjacent to one another with the peripheral edges of the first portions of the back parts aligned with the peripheral edges of the front part and flat against the front part, the first portions of the back parts together correspond exactly in size and shape to the front part, the two back parts are connected along free edges of their first portions to the front part along an outer circumference of the front part; the back parts have second portions connected to one another along their outer edges, wherein a circumference of the airbag where the first portions and the second portions of the back part meet is greater than a circumference of the peripheral edges of the front part, the connection of the second portions of the back parts being interrupted at least in one portion to form a gas inlet orifice;
   c) u shaped tear open seams that tear open when the airbag is filled with gas, each tear open seam connect the front part with the first portion of one of the back parts;
   d) outflow orifices in a back part for allowing gas to escape from the airbag, the outflow orifices are each only partially surrounded by the u shaped tear open seam; and
   e) an inner bag arranged inside the airbag and has a gas inlet orifice and at least one overflow orifice which connects the interior of the inner bag to the inner space of the airbag and, in an edge region of the gas inlet orifice of the inner bag, is connected, at least in portions, to an edge region of the gas inlet orifice of the airbag.

2. The airbag according to claim 1 wherein the inner bag has a smaller volume than the airbag.

3. The airbag according to claim 1 wherein when the airbag is in the deployed state the overflow orifices are directed essentially upward and downward perpendicularly to a main deployment direction.

4. The airbag according to claim 1 wherein the inner bag comprises two parts which are connected to one another in their circumferential regions.

5. The airbag according to claim 1 wherein the front part and the back parts are fabric pieces which are preferably stitched and/or adhesively bonded and/or heat-sealed to one another.

6. The airbag according to claim 1 wherein the front part has an asymmetric design.

* * * * *